US007922922B2

(12) United States Patent
Uyama

(10) Patent No.: US 7,922,922 B2
(45) Date of Patent: Apr. 12, 2011

(54) INK JET PRINT HEAD MANUFACTURING METHOD AND INK JET PRINT HEAD

(75) Inventor: Masaya Uyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 595 days.

(21) Appl. No.: 11/935,136

(22) Filed: Nov. 5, 2007

(65) Prior Publication Data

US 2008/0116167 A1 May 22, 2008

(30) Foreign Application Priority Data

Nov. 20, 2006 (JP) ................................ 2006-313400

(51) Int. Cl.
*G11B 5/127* (2006.01)
*G01D 15/00* (2006.01)
*C03C 15/00* (2006.01)
*C23F 1/00* (2006.01)

(52) U.S. Cl. .................. 216/27; 216/2; 216/11; 216/16; 216/41; 216/46; 216/52; 216/58; 216/83

(58) Field of Classification Search ................ 216/2, 11, 216/16, 27, 41, 46, 52, 58, 83
See application file for complete search history.

(56) References Cited

U.S. PATENT DOCUMENTS 5,387,314 A * 2/1995 Baughman et al. ............ 216/27
6,019,457 A 2/2000 Silverbrook
6,312,615 B1 * 11/2001 Silverbrook .................... 216/27
6,620,331 B1 * 9/2003 Laurell et al. .................... 216/2
6,676,844 B2 * 1/2004 Lee et al. ........................ 216/27
6,773,094 B2 8/2004 Linliu et al.
6,943,037 B2 * 9/2005 Anagnostopoulos et al. .... 438/3
7,086,142 B2 * 8/2006 Kim et al. ....................... 29/611
7,169,539 B2 * 1/2007 Lim et al. ...................... 430/320
7,178,905 B2 2/2007 Shin et al.
7,229,157 B2 * 6/2007 Conta et al. .................... 347/63
7,334,335 B2 * 2/2008 Shin et al. .................... 29/890.1
7,368,063 B2 * 5/2008 Kim et al. ....................... 216/27
2003/0145464 A1 8/2003 Linliu et al.
2004/0246310 A1 12/2004 Shin et al.

FOREIGN PATENT DOCUMENTS

TW 589253 6/2004

* cited by examiner

*Primary Examiner* — Nadine G Norton
*Assistant Examiner* — Christopher M Remavege
(74) *Attorney, Agent, or Firm* — Fitzpatrick, Cella, Harper & Scinto

(57) ABSTRACT

An object of this invention is to provide a manufacturing method that, by using a general-purpose semiconductor fabrication process, can easily manufacture an ink jet print head in which energy generating elements are complicatedly installed in the ink path. To this end, the present invention comprising steps of providing a substrate having a removal projected portion, forming an energy generating element along the projected portion, forming a supporting member on the energy generating element, and forming a ink chamber by removing the projected portion from the substrate.

10 Claims, 5 Drawing Sheets

INK JET PRINT HEAD MANUFACTURING METHOD AND INK JET PRINT HEAD

BACKGROUND OF THE INVENTION

1. Field of the Invention

The present invention relates to a method of manufacturing an ink jet print head that ejects ink in the form of droplets and the ink jet print head.

2. Description of the Related Art

An ink jet printing apparatus prints an image by ejecting ink in fine droplets from a plurality of ink ejection orifices arrayed in an ink jet print head (hereinafter also referred to simply as a print head). Generally, an ink jet print head has a plurality of ink ejection orifices, a plurality of ink paths communicating with the corresponding ink ejection orifices, and a plurality of heating resistors (heating resistors) as an energy generating element arranged in each of the ink paths. The heating resistor, when energized, converts an electric energy into a thermal energy, generates a bubble in the ink path by the thermal energy, and ejects ink from within the ink path through the ink ejection orifice in the form of ink droplets by a pressure of the bubble formed.

In such an ink jet print head, stabilizing the direction in which ink droplets are ejected from the ink ejection orifices is of great importance in realizing a high-quality image printing. Particularly, a high level of linearity is required of an ink droplet projection path from the ink ejection orifice, i.e., the ink droplet must land on a print medium with high precision.

For ink droplets to land on a print medium with high precision, a shape of each ink path in which a heating resistor is installed assumes importance. Japanese Patent Laid-Open No. 4-15595 proposes a print head having a structure in the ink path to enhance the landing accuracy of an ink droplet. The Japanese Patent Laid-Open No. 4-15595, as shown in FIG. 1, discloses heating resistors 5, that generate a thermal energy to eject ink, arranged on an inclined surface 3*a* of an ink chamber 9 that narrows toward an ink ejection orifice 11. The Japanese Patent Laid-Open No. 4-15595 also discloses the ink jet print head in which the heating resistors facing parallel each other.

However, highly feasible method for getting the print head of the above structure, for example the method for forming properly a recessed inclined surface, is not known yet.

SUMMARY OF THE INVENTION

It is an object of the present invention to provide a manufacturing method that, by using a general-purpose semiconductor fabrication process, can easily manufacture an ink jet print head in which energy generating elements are complicatedly installed in the ink path.

To achieve the above objective, the present invention has the following construction.

Viewed from one aspect the present invention provides a method of manufacturing an ink jet print head, wherein the ink jet print head includes an energy generating element for generating energy used for ejecting ink, a supporting member supporting the energy generating element, and ink chamber communicating to a ink ejection orifice which is formed corresponding to the energy generating element, the method comprising the steps of: providing a substrate having a removal projected portion; forming the energy generating element along a side wall of the projected portion; forming the supporting member on the energy generating element; forming the ink chamber by removing at least the projected portion from the substrate.

A second aspect of the present invention provides an ink jet print head manufactured by the above method.

With this invention, the ink chamber is formed by first forming energy generating elements along the projected portion on the substrate having the projected portion, and then removing the projected portion. This enables the ink chamber having a complicated structure and the energy generating elements to be formed with high precision by the general-purpose semiconductor fabrication process (e.g., photolithography and etching). As a result, an ink jet print head with high ejection accuracy can be manufactured easily and at low cost.

Further features of the present invention will become apparent from the following description of exemplary embodiments (with reference to the attached drawings).

DESCRIPTION OF THE EMBODIMENTS

Now, referring to the accompanying drawings, embodiments of this invention will be described in detail. It is noted, however, the embodiments that follow are not intended to limit the scope of this invention in any way but provided as examples in giving detailed explanations to a person having ordinary knowledge in the art.

Figure 4:
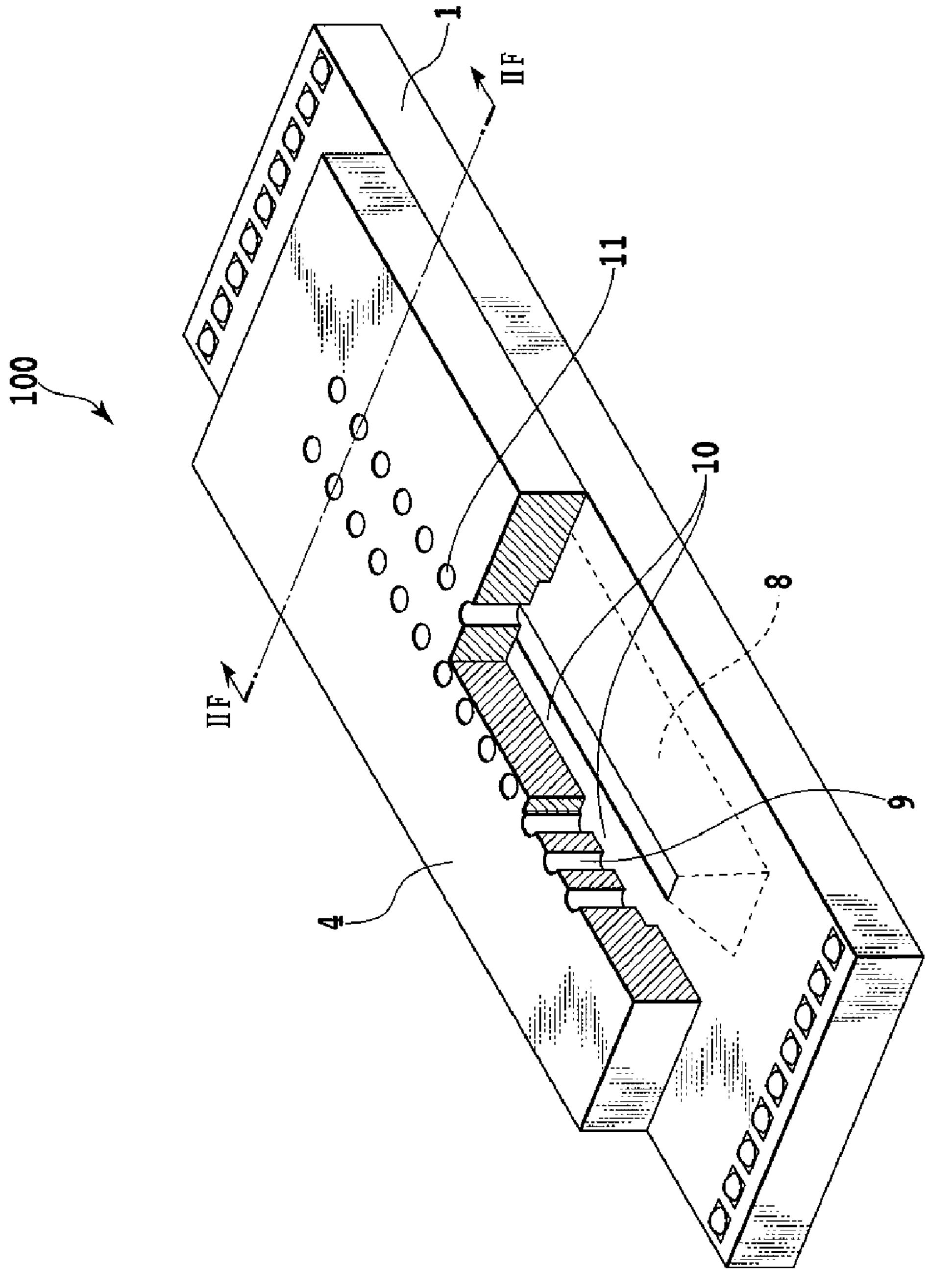
FIG. 4 is a schematic perspective view of an ink jet print head according to one embodiment of this invention.

FIG. 4 is a schematic perspective view showing an ink jet print head according to one embodiment of this invention.

As shown in FIG. 4, an ink jet print head 100 in this embodiment has a substrate 1 and an orifice plate 4 placed on and supported by the substrate. The orifice plate 4 is formed with a plurality of ink ejection orifices 11 at a predetermined pitch and also with a plurality of ink chambers 9 communicating with the corresponding ink ejection orifices. The orifice plate 4 serves as a supporting member that supports heating resistors (not shown) as an energy generating element to heat ink in each ink chamber 9 for ejection from the ink ejection orifice 11. Instead of the heating resistor, a piezo element can be used as a energy generating element. An arrangement of the heating resistors and a shape of the ink chambers 9 will be detailed later.

The substrate 1 is formed with an ink supply opening 8. The ink supply opening 8 communicates with the ink chambers 9 through an ink flow path 10, the ink chambers 9 leading to the associated ink ejection orifices 11. Ink from an ink source, such as an ink tank not shown, is supplied through the ink supply opening 8 and the ink flow path 10 to the ink chambers 9. The ink flow path 10, as shown in FIG. 2F, is formed between the substrate 1 and the orifice plate 4.

When mounted in the ink jet printing apparatus, the ink jet print head is so arranged that the side formed with the ink supply opening 8 faces a print plane of a print medium. Then, a thermal energy is applied from the heating resistor to the ink, which has been fed to the ink chamber 9 through the ink supply opening 8 and the ink flow path 10. This causes the ink in the ink chamber 9 to form a bubble in it, with the result that a pressure of the bubble expels an ink droplet from the ink ejection orifice 11. The ink droplet thus ejected adheres to the print medium, forming an image.

FIGS. 2A-2F are cross-sectional views showing a series of steps of manufacturing an ink jet print head according to one embodiment of this invention. These cross sections are taken for each fabrication step along a plane passing through line line IIF-IIF in FIG. 4 perpendicularly to the orifice plate 4. In this embodiment it is shown that a series of these manufacturing steps eventually results in a fabrication of an ink jet print head 100 of a cross-sectional structure of FIG. 2F.

Figure 1:
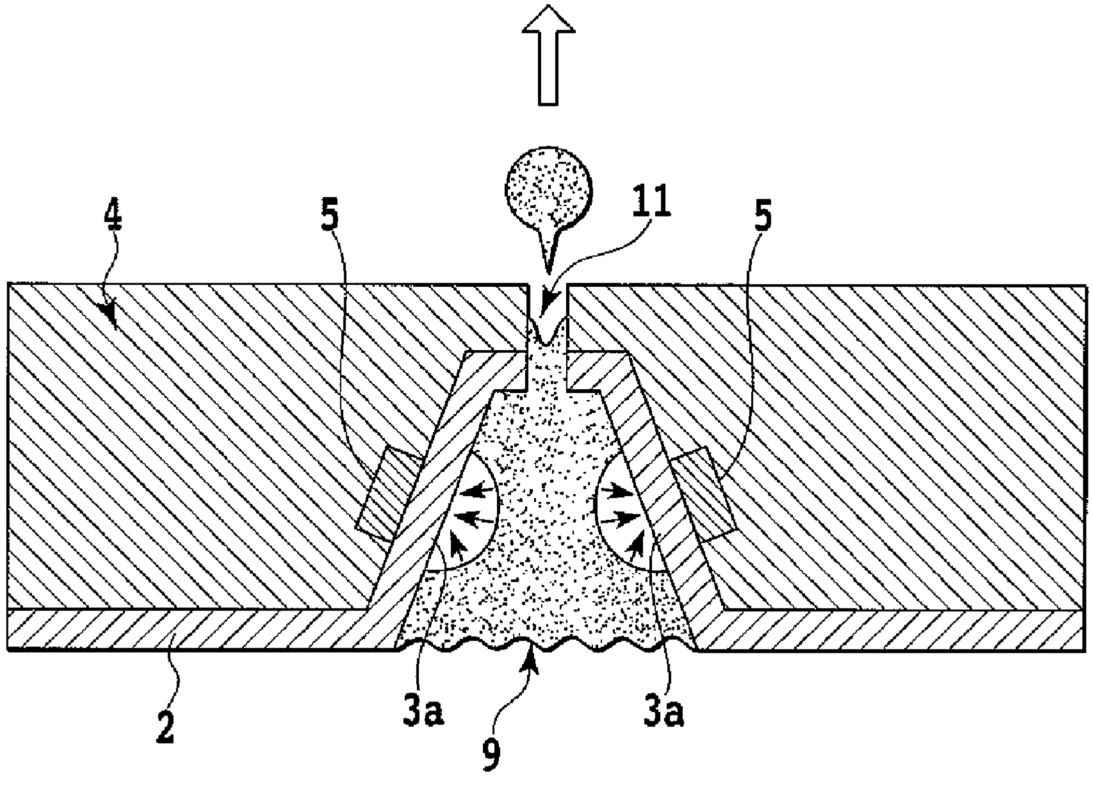
FIG. 1 is a schematic cross-sectional view conceptually showing how ink is ejected from an ink jet print head manufactured by a manufacturing method according to one embodiment of this invention.
Figure 2A:
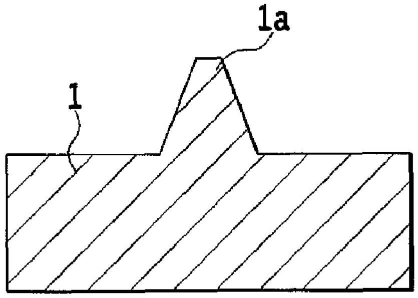
FIGS. 2A-2F are schematic cross-sectional views showing one example of an ink jet print head manufacturing method according to one embodiment of this invention.
Figure 2B:
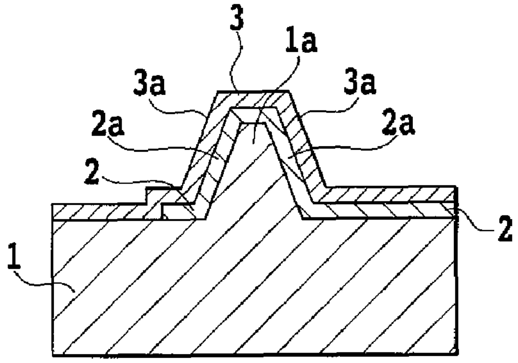
Figure 2C:
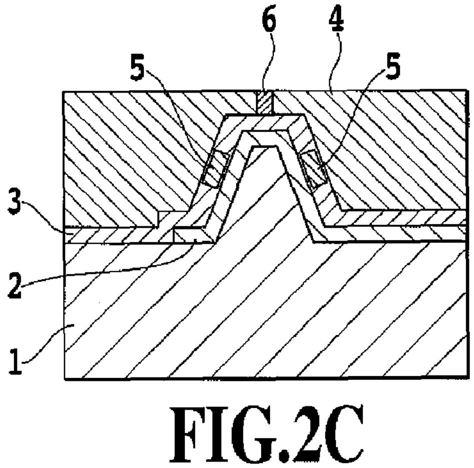
Figure 2D:
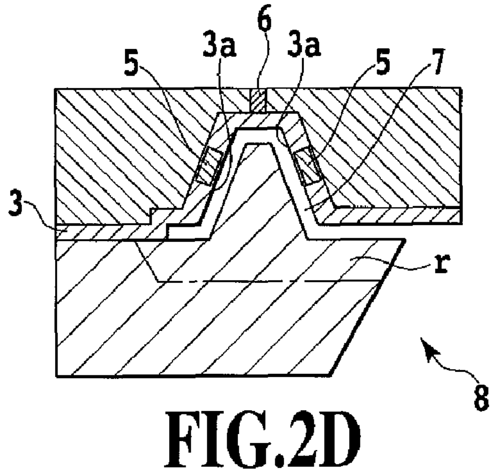
Figure 2E:
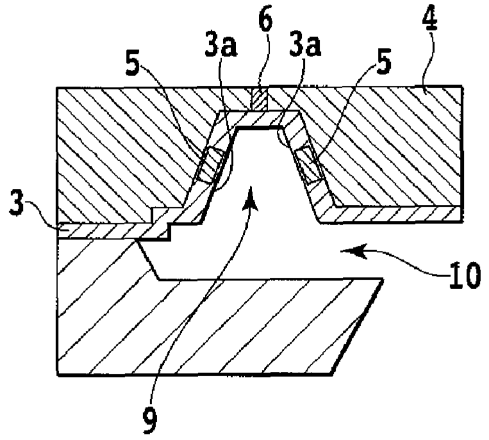
Figure 2F:
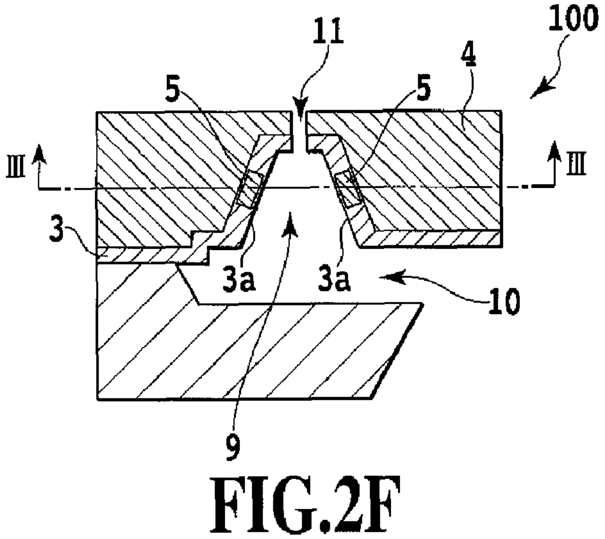
Figure 3:
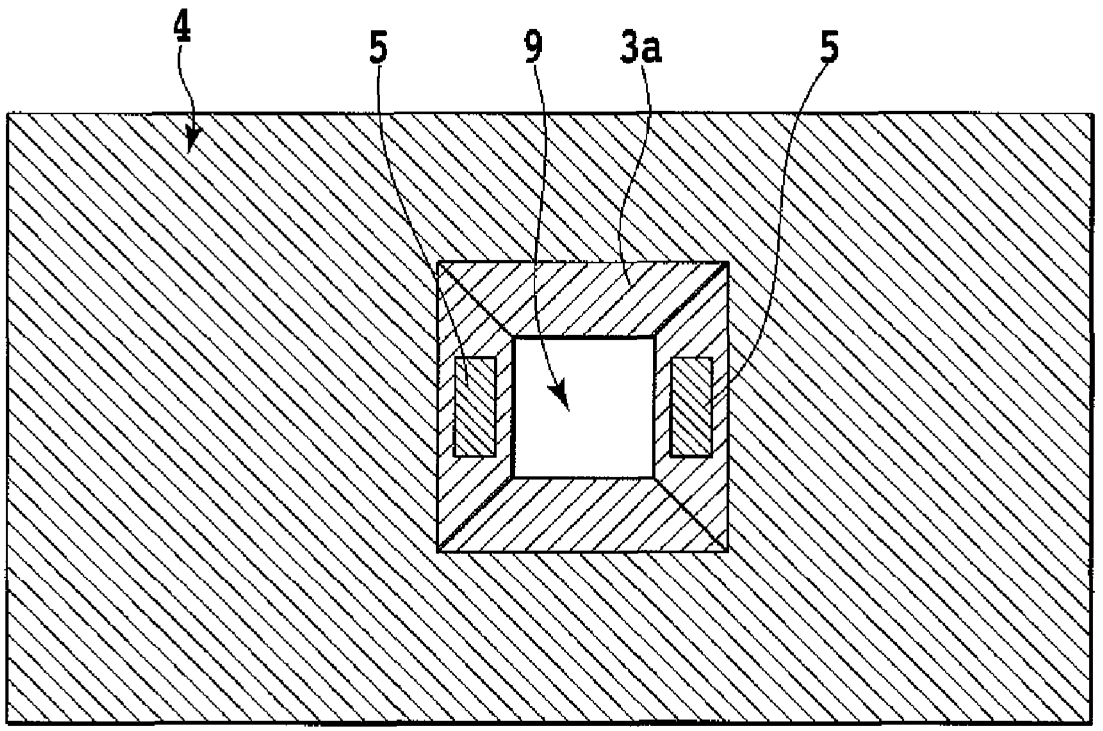
FIG. 3 is a schematic cross-sectional view of an ink jet print head according to one embodiment of this invention.

FIG. 3 is a schematic cross section of the ink jet print head taken along a plane passing through line line III-III of FIG. 2F parallel to the substrate 1, and seen from the ink ejection orifice 11 toward the substrate 1. The orifice plate 4 is formed with a plurality of ink ejection orifices 11, as described earlier, and also with an insulating layer 3 which, as shown in FIG. 3 and FIG. 2F, has formed inside thereof an ink chamber 9 trapezoidal in cross section that narrows toward the ink ejection orifice 11. In FIG. 3, reference number 3*a* denotes inclined portions of the ink chamber 9. In inner surfaces of the inclined portions 3*a* of the insulating layer 3 (in contact with the orifice plate 4), two heating resistors 5 are embedded at positions point-symmetric about the ink ejection orifice 11. It is noted, however, that the present invention is not limited to any particular number and arrangement of the heating resistors and include arrangements in which two or more heating resistors are used or in which they are arranged in circle.

Now, by referring to a manufacturing process shown in FIGS. 2A-2F, the method of manufacturing the ink jet print head 100 according to this embodiment will be explained.

First, as shown in FIG. 2A, a projected portion 1*a* having inclined surfaces is formed on the substrate 1. The substrate 1 is preferably made of monocrystal silicon. The projected portion 1*a* may be formed to have a trapezoidal cross section with a flat top or may be formed into a shape having a roughly triangular cross section with a pointed top. It is also possible to form the projected portion 1*a* into various other shapes, such as truncated cone, quadrangular pyramid, multangular pyramid and circular cone. Further, the projected portion 1*a* can be formed into a hemispherical shape. In this case, the projected portion 1*a* have a curved surface. The cross-sectional area of the projected portion 1*a*, which is taken along a plane parallel to the substrate 1, decreases, as the distance between the cross section and the substrate 1 increases. Further, the projected portion can be formed into a pole shape, and the side wall may be perpendicular to the substrate substantially.

When the substrate 1 is a single crystal silicon substrate, the projected portion 1*a* can be formed by anisotropic etching, wet etching or dry etching through an optimal mask.

If the substrate 1 is not of single crystal silicon, the projected portion 1*a* may be formed of silicon oxides, or metals or metal compounds that can be removed by acid or alkali. That is, when silicon oxides are to be used, the projected portion 1*a* may be formed by a CVD (chemical vapor deposition) method. When a metal, such as aluminum, is used, sputtering may be used to form the projected portion 1*a*. In either case, a deposited film is subjected to patterning and etching through an appropriate mask to form the projected portion 1*a*.

Further, when the substrate 1 is not of single crystal silicon, the projected portion 1*a* can be formed by applying a photoresist or photosensitive polymer to the deposited film, covering it with an appropriate mask, and subjecting it to exposure and development process.

Next, as shown in FIG. 2B, a sacrifice layer 2 is formed over a part of an upper surface (one of the surfaces) of the substrate 1 including the projected portion 1*a*. Now, a protruding portion composed of the projected portion 1*a* and the sacrifice layer 2 is formed. Over the sacrifice layer 2 and the upper surface of the substrate 1 is formed an insulating layer 3 (first insulating layer) made of an insulating material (first insulating layer forming step). At this time, the sacrifice layer 2 and the insulating layer 3 are both formed with inclined portions 2*a*, 3*a* conforming to the outer surface geometry of the projected portion 1*a* of the substrate 1.

The sacrifice layer 2 is made of a material that is etched faster than those of the surrounding portions (substrate 1 and insulating layer 3). Depending on the materials of the surrounding portions, the sacrifice layer 2 may be formed of, for example, silicon oxide, polysilicon, aluminum, photoresist and photosensitive polymer. The sacrifice layer 2 is then patterned to a desired pattern.

The insulating layer 3 is required to have a function of insulating wires that transmit electric signals to heating resistors 5 to be formed later and protecting them from impacts produced during a bubble forming process and also a function of an etch resistant, etch stop layer for the sacrifice layer 2. Depending on the materials of the surrounding portions, the insulating layer 3 may be formed of, for example, silicon nitride and silicon oxide films.

Next, as shown in FIG. 2C, heating resistors 5 are formed along the inclined portions 3*a* which are side wall portions of the insulating layer 3 formed on a surface of the projected portion 1*a*. This is called a heating resistor forming step. Then, wires (not shown) to transmit electric signals to the heating resistors thus formed are deposited. An orifice plate as a supporting member which supports the heating resistor 4 and a nozzle core 6, that will form an ink ejection orifice in a later step, are formed. The heating resistors 5 and the wires for transmitting electric signals to the heating resistors 5 may be formed by a general-purpose semiconductor fabrication process. For an application of resist to the inclined portions 3*a* of the insulating layer 3, a spraying method may be used. For an exposure, an exposure device using a projection lens with a large focal depth may be used. In this embodiment, another insulating layer 3 (second insulating layer) is formed to cover all of the heating resistors 5 and the wires for transmitting electric signals to the heating resistors 5 (second insulating layer forming step). This causes the heating resistors 5 and the wires to be enveloped in the insulating layer 3. The nozzle cores 6 can be formed using photoresist or photosensitive polymer. The orifice plate 4 is preferably made of a metal material that enables the orifice plate 4 to be formed by plating. This metal material may include, for instance, gold.

Next, the surface of the orifice plate is planarized. Because the orifice plate 4 is undulated by an uneven surface of the underlying structure, it needs to be planarized. This planarization step may use, for example, a CMP (chemical mechanical polishing).

As for the thickness of the sacrifice layer 2, it is preferably chosen in a range of, say, 1,000-10,000 Å, considering an efficiency of forming the sacrifice layer 2 and an ease of handling with which to remove the sacrifice layer 2 from the substrate 1. The insulating layer 3 is required to have a function of securing insulation of individual heating resistors and insulation between wires and also a function of protecting the heating resistors and wires against ink in the ink paths. The material and thickness of the insulating layer 3 are determined by taking these functions into account. When silicon nitride is used for the insulating layer 3, its thickness is preferably chosen in a range of 1,000-20,000 Å.

To protect the nozzle core 6 and orifice plate 4 in the subsequent steps, it is desired that, after the planarization step, the nozzle core 6 and the orifice plate 4 be applied cyclized rubber (not shown) and baked.

Next, as shown in FIG. 2D, the substrate 1 is etched from the back to form an ink supply opening 8. This etching is continued until the ink supply opening 8 reaches the sacrifice layer 2. Then, the sacrifice layer 2 is removed through the ink supply opening 8 thus formed, providing a space 7 between the substrate 1 and the insulating layer 3. FIG. 2D shows a case where the ink supply opening 8 is formed by a crystal anisotropic etching.

The method of forming the ink supply opening 8 can be determined according to the material of the substrate 1. When the substrate 1 is made of single crystal silicon, it is preferably etched by crystal anisotropic etching or dry etching. For crystal anisotropic etching, alkaline water solution may be advantageously used, such as a water solution of potassium hydroxide or tetramethylammonium hydroxide (TMAH). An etch mask may be obtained by patterning silicon oxide or photoresist into a desired pattern.

As for the removal of the sacrifice layer, if the sacrifice layer 2 is formed of silicon oxide, hydrofluoric acid gas is advantageously used for etching. If the sacrifice layer 2 is formed of polysilicon or aluminum, an alkaline water solution, such as potassium hydroxide or tetramethylammonium hydroxide (TMAH) water solution, may be used. If the sacrifice layer 2 is formed of photoresist or photosensitive polymer, the sacrifice layer 2 can be removed by a polar solvent or organic amine-based removing liquid.

Next, an ink chamber 9 is formed, as shown in FIG. 2E. The process of forming the ink chamber 9 involves introducing the removal agent through the ink supply opening 8 into the space 7, that was formed by removing the sacrifice layer 2, to remove the projected portion 1*a* that was formed in the step of FIG. 2A and to etch an area including a part of the substrate (area r above one-dot chain line in FIG. 2D). Now, the ink chamber 9 and the ink flow path 10 are formed.

As for the method of removing the projected portion 1*a*, if the projected portion 1*a* is formed of single crystal silicon, the crystal anisotropic etching, wet etching or dry etching may be applied. For the crystal anisotropic etching, a possible etchant may include, for example, potassium hydroxide or tetramethylammonium hydroxide (TMAH) water solutions. For the wet etching, a mixture of hydrofluoric acid, nitric acid and acetic acid may be used. For the dry etching, xenon fluoride gas may be used. Or if the projected portion 1*a* is formed of photoresist or photosensitive polymer, the projected portion 1*a* can be removed by polar solvent or organic amine-based removing liquid. In this way, the ink chamber 9 can be formed.

In forming the ink flow path 10, if the substrate 1 is formed of single crystal silicon, crystal anisotropic etching, wet etching and dry etching may be applied. When the crystal anisotropic etching is performed, a possible etchant includes, for example, potassium hydroxide or tetramethylammonium hydroxide (TMAH) water solutions. When the wet etching is performed, a mixture of hydrofluoric acid, nitric acid and acetic acid may be used. For the dry etching, xenon fluoride gas may be used.

If the substrate 1 and the projected portion 1*a* are both formed of single crystal silicon, the etching in the substrate 1 proceeds faster on the projected portion 1*a* than on flat portions other than the projected portion 1*a*, as can be seen when the process of etching is considered. So, where the substrate 1 and the projected portion 1*a* are both formed of single crystal silicon, the step of removing the projected portion 1*a* to form the ink chamber 9 and the step of forming the ink flow path can be performed at the same time. In the above way, wall surfaces can be formed into the substrate.

After this, the cyclized rubber, if applied to protect the nozzle core 6 and orifice plate 4 as described earlier, is eliminated by nonpolar solvent, such as xylene.

Next, the nozzle core 6 shown in FIG. 2E is removed to form an upper part of the ink ejection orifice 11. Then, as shown in FIG. 2F, the insulating layer 3 existing right below the overlying ink ejection orifice 11 is removed through the ink ejection orifice 11. As a result, the ink ejection orifice 11 which communicates the ink chamber 9 to upper space of the ink chamber is formed. In this embodiment, the supporting member for supporting the heating resistor 5 is a orifice plate 4 in which the ejection orifice 11 is formed.

As a final step, the substrate thus fabricated is cut by a dicer into separate chips, as required, to manufacture a plurality of ink jet print heads 100 of a desired size with a desired number of ink ejection orifices.

Figure 5:
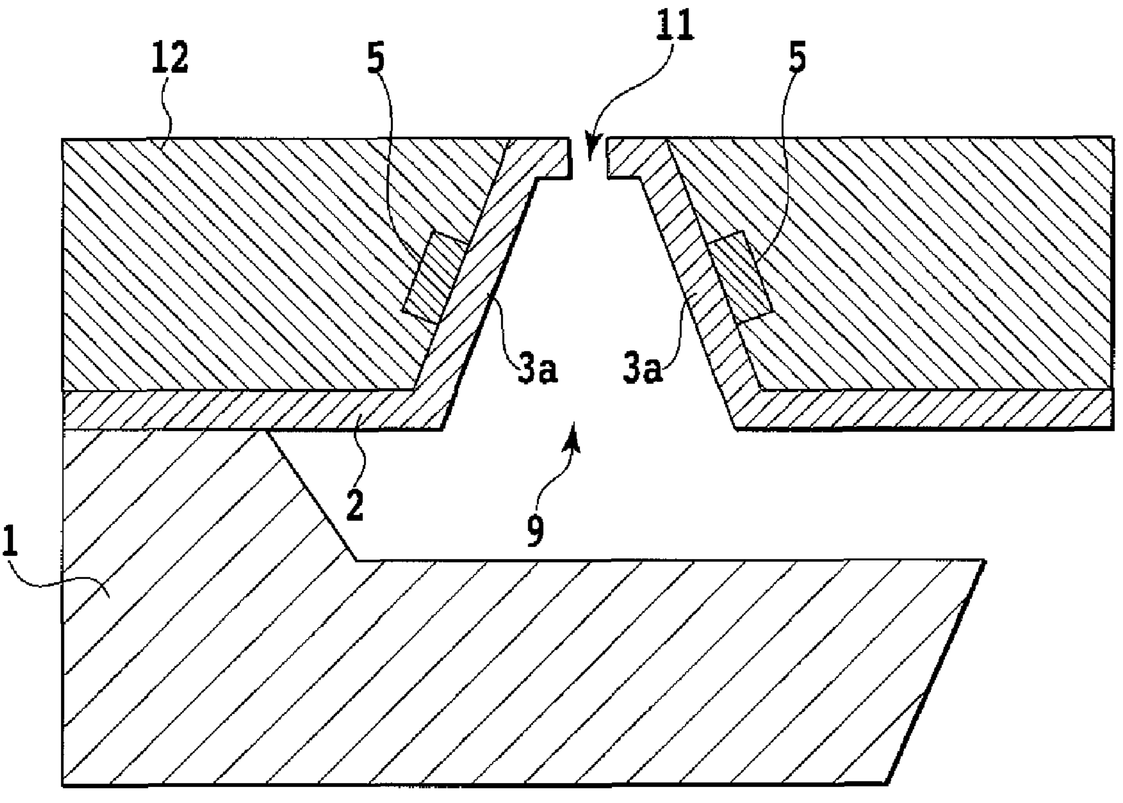
FIG. 5 is a schematic cross-sectional view conceptually showing an ink jet print head manufactured by a manufacturing method according to another embodiment of this invention.

While, in the above embodiment, the heating resistors 5 have been described to be enveloped in the insulating layer 3, as shown in FIG. 2D, they may be formed to protrude outside the inclined surface of the insulating layer 3*a* as shown in FIG. 5. That is, the heating resistors 5 may be formed to be embedded in the supporting member 4. This can be realized by forming the insulating layer 3 to a predetermined thickness, forming the heating resistors 5, and then forming the supporting member 4 to cover the heating resistors 5 and the insulating layer 3. Further, as shown in FIG. 5, ink ejection orifice 11 may be formed to only the insulating layer 3 without forming the ink ejection orifice 11 to the supporting member 12 which supports the heating resistors 5.

Embodiment

Now, the method of manufacturing the ink jet print head 100 of this invention will be explained in more detail by taking up an example embodiment that follows.

In this embodiment, a silicon wafer 625 μm thick with an ingot orientation of <100> was prepared as a substrate 1. A photoresist was applied to the substrate 1 and patterned as a mask. This was taper-etched by dry etching to form a projected portion 1*a* with inclined surfaces as shown in FIG. 2A.

After this, the substrate 1 formed with the projected portion 1*a* was deposited with silicon oxide by CVD (chemical vapor deposition) to form a sacrifice layer 2. Next, a photo resist mask was formed to pattern the sacrifice layer 2. Further, a silicon nitride film was deposited to form an insulating layer 3 as shown in FIG. 2B.

Next, using a general-purpose semiconductor fabrication process, heating resistors 5 and their wires (not shown) were formed. Photoresist was sprayed to the inclined surfaces of the projected portion 1*a* by a spray method. As an exposure device or stepper, a divided projection exposure device of Ushio Inc. make using a lens with a large focal depth was used.

Next, a silicon nitride film was formed by CVD to form an insulating layer again. This caused the heating resistors 5 to be enveloped in the insulating layer 3 (as shown in FIG. 2C).

Next, at locations where ink ejection orifices would be formed in the subsequent steps, nozzle cores 6 were patterned by photoresist. Then, gold was plated by electrolytic plating to form an orifice plate 4.

Further, the orifice plate 4 was polished to planarize its surface, after which cyclized rubber (not shown) was applied to the nozzle cores 6 and orifice plate 4 and baked, to protect the nozzle core 6 and the orifice plate 4 from the subsequent steps.

Next, a silicon oxide film (not shown) was formed at the back of the substrate 1 and, with a photoresist as a mask, was patterned by buffered hydrofluoric acid to form an opening that defines a position of the ink supply opening 8.

Next, the substrate assembly was dipped in a 21-wt % water solution of tetramethylammonium hydroxide at a temperature of 83° C. to get etching to proceed from the opening formed in the silicon oxide film formed at the back of the substrate 1. The etching reached the sacrifice layer 2 in approximately 15 hours, forming the ink supply opening 8. Then, hydrogen fluoride gas was introduced from the ink supply opening 8 to remove the sacrifice layer 2 by etching, thus forming a space 7 (FIG. 2D).

Next, the wafer was again submerged in the water solution of tetramethylammonium hydroxide to etch the projected portion 1*a* and substrate 1 from the space 7 formed in the step of FIG. 2D. As a result of the etching, an ink chamber 9 and an ink flow path 10 were formed (see FIG. 2E).

After the wafer was thoroughly washed with water and dried, the cyclized rubber (not shown) formed to protect the nozzle core 6 and the orifice plate 4 was removed by xylene and the nozzle core 6 was removed by acetone, thus forming an upper part of the ink ejection orifice 11.

Next, a part of the insulating layer 3 was removed by dry etching from the top of the ink ejection orifice 11 to form the ink ejection orifice 11 so that the ink chamber 9 could communicate with an outer space. As a final step, the wafer was cut into separate chips by a dicer, completing the ink jet print head as shown in FIG. 2F.

The present invention is applicable to an ink jet print head mounted in an ink jet printing apparatus that forms an image by ejecting ink of a desired color in fine ink droplets onto a print medium at desired positions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-313400, filed Nov. 20, 2006, which is hereby incorporated by reference herein in its entirety.

What is claimed is:

1. A method of manufacturing an ink jet print head, wherein the ink jet print head includes an energy generating element for generating energy used for ejecting ink, a supporting member supporting the energy generating element, and an ink chamber communicating to an ink ejection orifice which is formed corresponding to the energy generating element, the method comprising the steps of:

providing a substrate having a removal projected portion;

forming the energy generating element so as to be supported with a side wall of the projected portion;

forming the supporting member on the energy generating element; and forming the ink chamber by removing at least the projected portion from the substrate.

2. The method of manufacturing an ink jet print head according to claim 1, wherein the substrate providing step includes a projected portion forming step, the projected portion forming step including a step of forming a portion of the substrate using crystal anisotropic etching, wet etching or dry etching.

3. The method of manufacturing an ink jet print head according to claim 1, wherein the projected portion is formed of silicon oxide, metal compound, photoresist or photosensitive polymer.

4. The method of manufacturing an ink jet print head according to claim 1, wherein the projected portion has an inclined surface which accomplishes an angle of attack to the surface on which the projected portion is formed and the energy generating element is formed along the inclined surface.

5. The method of manufacturing an ink jet print head according to claim 1, wherein the substrate providing step includes a projected portion forming step which includes a step of forming a removable projected portion on the substrate and a step of forming a sacrifice layer along an outer surface of the projected portion; and wherein the sacrifice layer is formed of a material that is etched faster than a material forming a portion surrounding the sacrifice layer.

6. The method of manufacturing an ink jet print head according to claim 1, wherein an insulating layer formed of an insulating material is formed on the surface of the projected portion.

7. The method of manufacturing an ink jet print head according to claim 6, wherein an another insulating layer is formed on the energy generating element which is formed on the insulating layer on the surface of the projected portion.

8. The method of manufacturing an ink jet print head according to claim 1, wherein the energy generating element is a heating resistor.

9. The method of manufacturing an ink jet print head according to claim 1, wherein the supporting member is an orifice plate which forms the ink ejection orifice.

10. The method of manufacturing an ink jet print head according to claim 1, wherein the ink chamber forming step includes a step of removing the projected portion and forming a wall of an ink path communicating to the ink chamber.

* * * * *